United States Patent
Taguchi (12) 
(10) Patent No.: US 6,772,917 B2
(45) Date of Patent: Aug. 10, 2004

(54) LIQUID CRYSTAL APPLICATOR AND LIQUID CRYSTAL APPLICATION METHOD, AND APPARATUS FOR MANUFACTURING LIQUID CRYSTAL PANEL

(75) Inventor: Tatsuhiro Taguchi, Hadano (JP)

(73) Assignee: Shimadzu Corporation, Kyoto (JP)

( * ) Notice: Subject to any disclaimer, the term of this patent is extended or adjusted under 35 U.S.C. 154(b) by 154 days.

(21) Appl. No.: 10/179,150

(22) Filed: Jun. 25, 2002

(65) Prior Publication Data

US 2002/0196381 A1 Dec. 26, 2002

(30) Foreign Application Priority Data

Jun. 25, 2001 (JP) ........................................ 2001-191271

(51) Int. Cl.[7] .............................................. B05C 5/00
(52) U.S. Cl. ........................ 222/203; 222/196; 222/420
(58) Field of Search ................................ 222/196, 202, 222/203, 420, 422

(56) References Cited

U.S. PATENT DOCUMENTS 4,819,831 A * 4/1989 Green et al. ................ 222/420
4,934,564 A * 6/1990 Piatt ............................ 222/14
6,331,884 B1 * 12/2001 Masazumi et al. .......... 349/156

* cited by examiner

Primary Examiner—J. Casimer Jacyna
(74) Attorney, Agent, or Firm—Rankin, Hill, Porter & Clark LLP (57) ABSTRACT

A granular liquid crystal of uniform grain diameter is discharged from a liquid crystal application unit. A charged plate ionizes the discharged granular liquid crystal. A power source supplies a plus voltage to the charged plate via a switch which turns on or off a supplied voltage from the power source. If the switch is turned on, the granular liquid crystal is ionized, and the ionized granular liquid crystal is deflected by a deflecting plate to reach a substrate. On the other hand, if the switch is turned off, the granular liquid crystal is not ionized, and not deflected by the deflecting plate to be captured by a garter. The switch is turned on or off in synchronism with the frequency of the piezoelectric transducer, whereby a desired amount of liquid crystal can be dripped on the substrate.

10 Claims, 10 Drawing Sheets

MOVEMENT

FIG. 10
PRIOR ART

LIQUID CRYSTAL APPLICATOR AND LIQUID CRYSTAL APPLICATION METHOD, AND APPARATUS FOR MANUFACTURING LIQUID CRYSTAL PANEL

BACKGROUND OF THE INVENTION

1. Field of the Invention

The present invention relates to a liquid crystal applicator and a liquid crystal application method for applying a liquid crystal on a substrate, and an apparatus for manufacturing a liquid crystal panel having the liquid crystal applicator.

2. Description of the Related Art

A liquid crystal panel for use with a display device for the information equipment has a liquid crystal filled into a gap (liquid crystal pouring space) of as large as about several µm that is formed by inserting a spacer between a pair of glass substrates. One method for filling the liquid crystal between the substrates involves forming a filler hole 102 through a panel 100 consisting of a pair of substrates laminated by an adhesive 101 and pouring the liquid crystal through the filler hole 102 owing to a differential pressure, as shown in FIG. 9.

Figure 9:
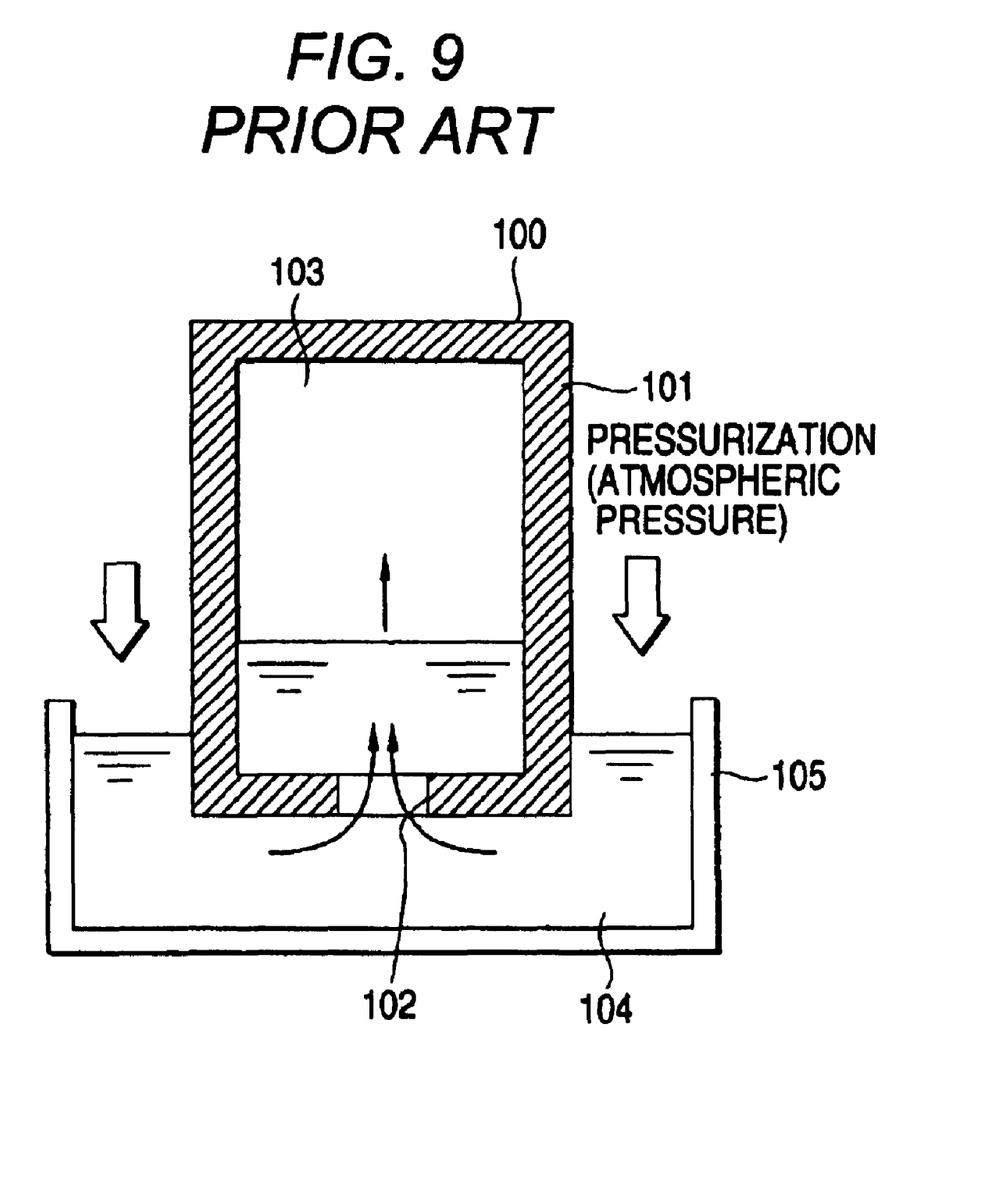
FIG. 9 is a view for explaining the related-art liquid crystal pouring method.

A liquid crystal container 105 for containing a liquid crystal 104 and the panel 100 are placed within a vacuum vessel, and the filler hole 102 of the panel 100 is immersed in the liquid crystal 104, as shown in FIG. 9. Thereafter, the vacuum vessel is supplied with a gas and placed in a pressurized (or atmospheric pressure) state. Since a liquid crystal pouring space 103 formed by the substrates and the adhesive 101 has been evacuated, the liquid crystal 104 enters from the liquid crystal container 105 into the liquid crystal pouring space 103 owing to a differential pressure. If the liquid crystal space 103 is filled with the liquid crystal 104, the filler hole 102 is sealed with the adhesive.

Figure 10:
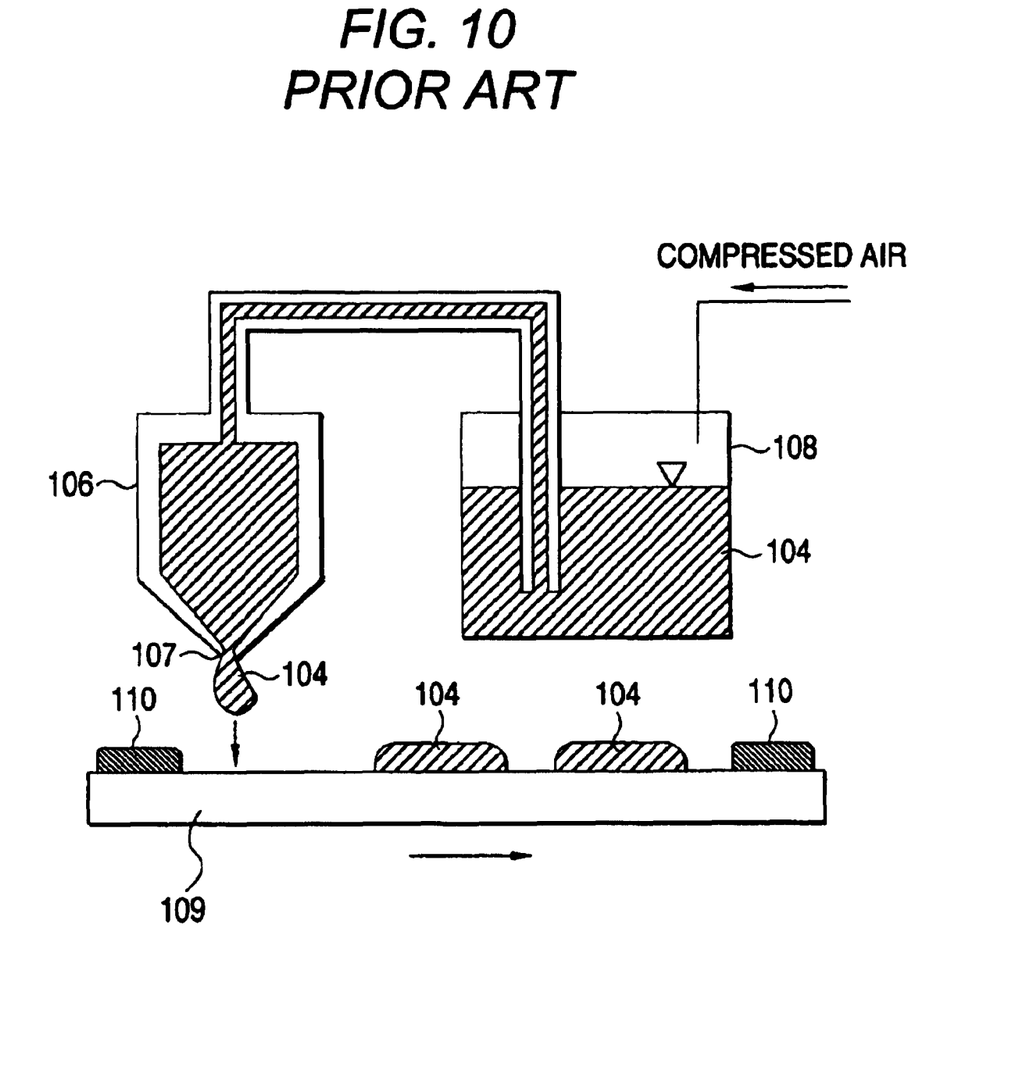
FIG. 10 is a view for explaining the application of liquid crystal employing the related-art dispenser.

However, there was a problem that the liquid crystal pouring method of FIG. 9 had a longer pouring time and the lower productivity, along with the increased size of the panel 100 and the smaller panel gap size. Instead of this pouring method, a method of laminating one substrate with another substrate after applying the liquid crystal on the one substrate, employing a dispenser 106 as shown in FIG. 10.

In this dispenser system, the liquid crystal 104 within a tank 108 is force fed to the dispenser 106, using a gas pressure of the compressed air to discharge liquid droplets of the liquid crystal 104 through a nozzle 107 of the dispenser onto a substrate 109. The substrate 109 has applied an adhesive 110 serving as a sealing agent and the liquid crystal droplets 104 are dripped uniformly on a region surrounded by the adhesive 110 by moving the substrate 109 or dispenser 106. Thereafter, this substrate 109 is laminated with the other substrate (not shown) to produce the liquid crystal panel.

However, with the related-art dispenser system, since the liquid crystal 104 is force fed to the dispenser 106, using a gas pressure, and discharged, there is a great dispersion in the discharge amount in a situation where the discharge is started or stopped, such as a pressure rise delay at the start of discharge, resulting in a problem that the quantitative stability in the discharge amount is impaired. Also, since the discharge is turned on or off under the control of gas pressure, the resolution of discharge amount is poor, and the quantitative stability is impaired as the required discharge amount is smaller.

SUMMARY OF THE INVENTION

It is an object of the invention to provide a liquid crystal applicator of dispenser system that has the improved quantitative stability and a liquid crystal application method, and an apparatus for manufacturing a liquid crystal panel having the liquid crystal applicator.

The embodiments of the present invention will be set forth below with reference to FIGS. 1, 5 and 8.

Figure 1:
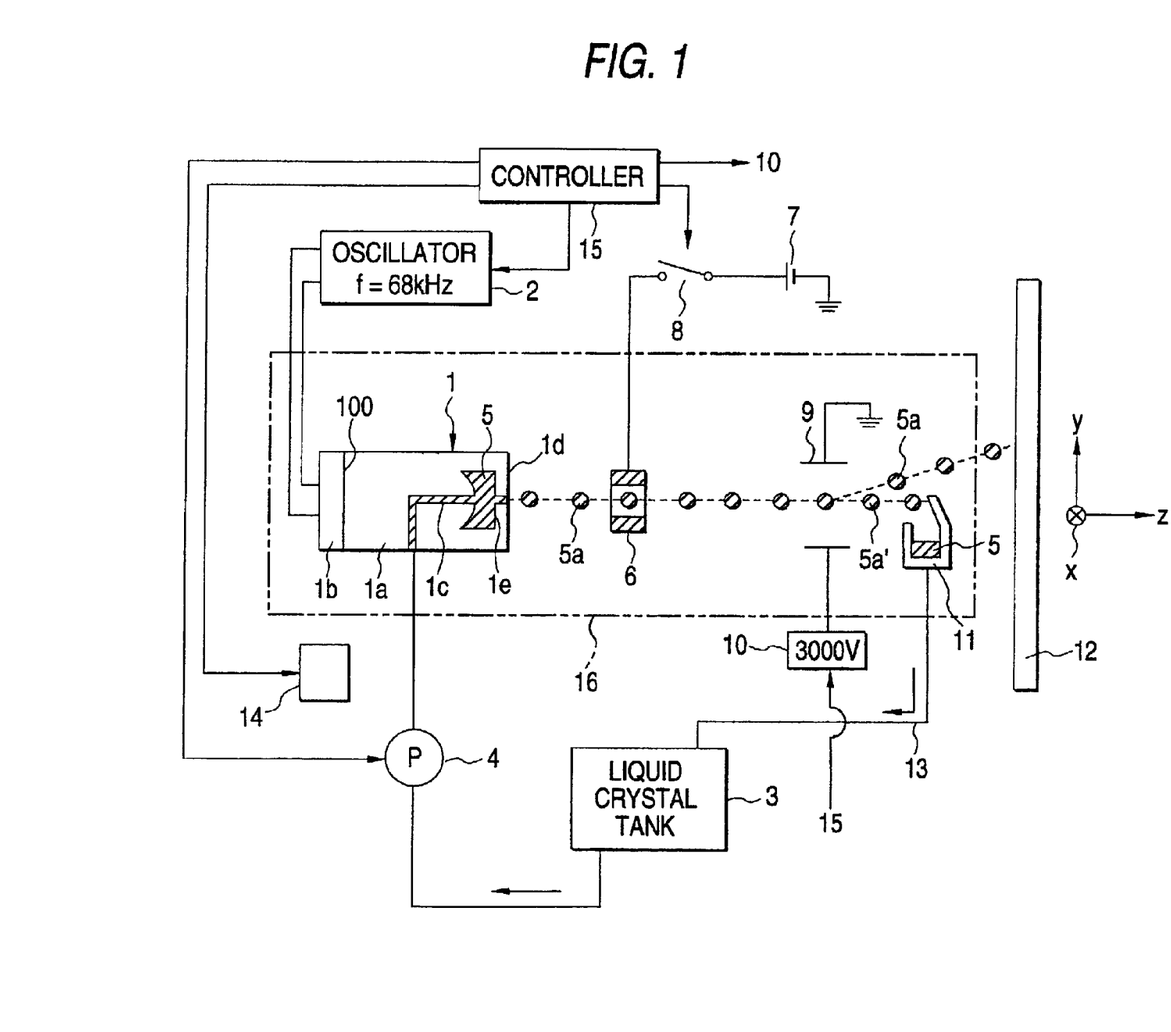
FIG. 1 is a block diagram showing the schematic configuration of a liquid crystal applicator according to one embodiment of the present invention.

(1) In order to accomplish the above object, according to a first aspect of the invention as shown in FIG. 1, there is provided a liquid crystal applicator for applying a liquid crystal on a substrate 12, comprising a liquid crystal discharge unit 1 having a piezoelectric transducer 1b for discharging a liquid crystal 5a due to a vibration of the piezoelectric transducer 1b, a switch unit 6, 8, 9, 11 for switching whether the liquid crystal 5a discharged from the liquid crystal discharge unit 1 is led to the substrate 12, and a controller 15 for controlling the switch unit 6, 8, 9, 11 so that a predetermined amount of liquid crystal 5a may be applied on the substrate 12.

Figure 5:
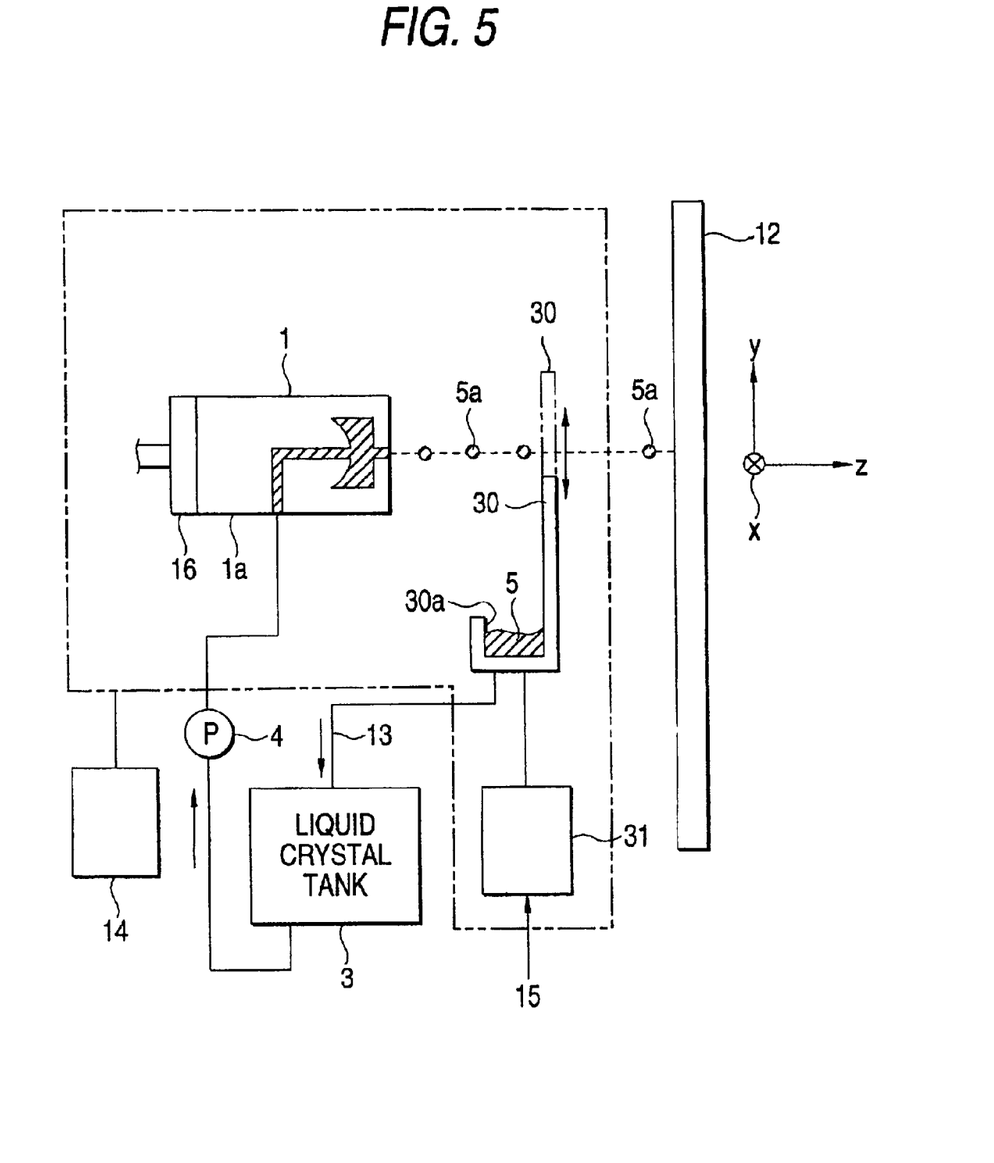
FIG. 5 is a diagram showing a first variation example of a shutter mechanism.

(2) According to a second aspect of the invention as shown in FIG. 5, in the above-mentioned liquid crystal applicator, it is preferable that the switch unit comprises a shutter plate 30 for capturing the liquid crystal 5a discharged from the liquid crystal discharge unit 1, and a shutter plate driver 31 for driving the shutter plate 30 to move into or from a path of the liquid crystal.

(3) According to a third aspect of the invention as shown in FIG. 1, in the above-mentioned liquid crystal applicator, it is also preferable that the switch unit comprises an ionizer 6 for ionizing the liquid crystal 5a discharged from the liquid crystal discharge unit 1, a capture member 11 disposed in a discharge direction of the liquid crystal 5a and capturing the liquid crystal 5a, and a deflector 9 for deflecting the ionized liquid crystal 5a to be led to the substrate, wherein the controller 15 controls the ionizer 6 to be turned on or off so that a predetermined amount of liquid crystal 5a maybe applied on the substrate 12.

Figure 8:
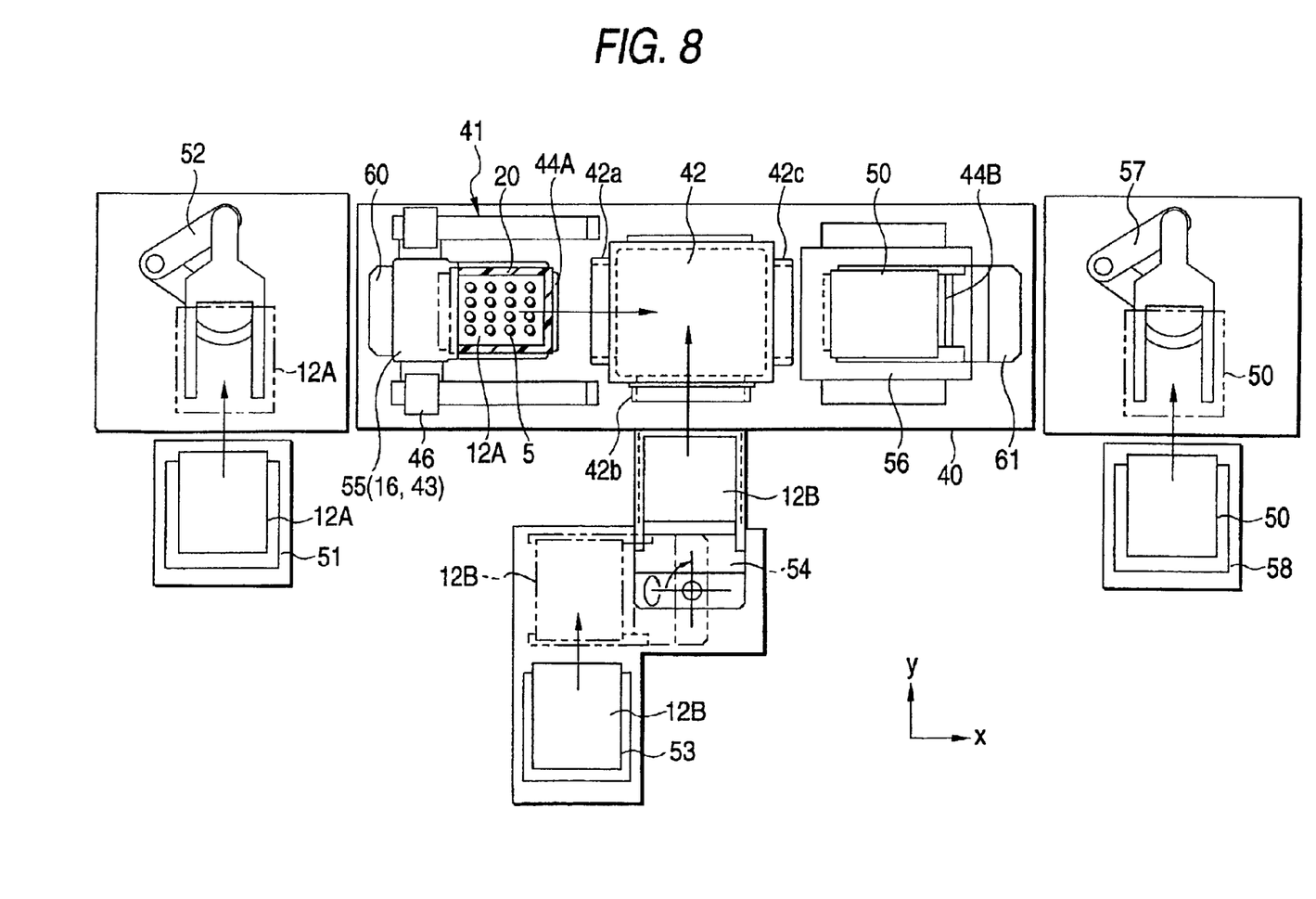
FIG. 8 is a plan view of the liquid crystal drip laminator 40.

(4) According to a fourth aspect of the invention as shown in FIG. 8, there is provided an apparatus for manufacturing a liquid crystal panel 40 for laminating a first substrate 12B and a second substrate 12A having a liquid crystal dripped on one face so that the liquid crystal 5 may be provided between the first substrate 12B and the second substrate 12A to form a liquid crystal panel 50, wherein the liquid crystal is applied on one face of the second substrate 12A, employing the liquid crystal applicator 41 according to any one of the first to third aspects of the invention.

Though the embodiments are set forth with reference to the accompanying drawings to make the understanding easier, the invention is not limited to the above embodiments.

DETAILED DESCRIPTION OF THE INVENTION

The preferred embodiments of the present invention will be described below with reference to the accompanying drawings. FIG. 1 is a block diagram showing the schematic configuration of a liquid crystal applicator according to one embodiment of the present invention. A dispenser 1 comprises a piezoelectric transducer 1b, and a head portion 1a connected to an ultrasonic wave radiating surface 100 of the piezoelectric transducer 1b. The head portion 1a constitutes a so-called ultrasonic wave transmission hone, and is designed to have a greater amplitude of vibration at its top end. Within the head portion 1a, a pipe line 1c and a cavity 1e are formed. Liquid crystal of a liquid crystal tank 3 is supplied into the cavity 1e by a liquid feed pump 4. A vibrator 1b has a number of piezoelectric element plates laminated in aligned polarity, wherein if a high frequency voltage (e.g., at a frequency f=66 kHz) is supplied by an oscillator 2, the vibrator 1b stretchingly vibrates axially (z-axis direction in the figure) at the frequency f.

The liquid crystal 5 supplied by the pump 4 is discharged through an aperture 1d formed at the top end of the head portion 1a. If vibration of the vibrator 1b is applied to the head portion 1a, discharged liquid crystal is severed into granules, and granular liquid crystal 5a is forcibly discharged through the aperture 1d in the z direction. The head portion 1a is designed to have a greater amplitude at the top end where the aperture 1d is formed, as described above. Therefore, the face having the aperture 1d formed vibrates in the z direction as seen in the figure. FIGS. 2A–2D are views showing the formation of a granular liquid crystal 5a that proceeds in the order of FIG. 2A to FIG. 2D with the lapse of time.

Figure 2A:
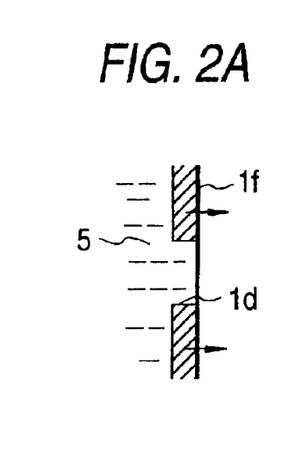
FIGS. 2A–2D are views showing the formation of a granular liquid crystal 5a that proceeds in the order of FIG. 2A to FIG. 2D with the lapse of time.
Figure 2B:
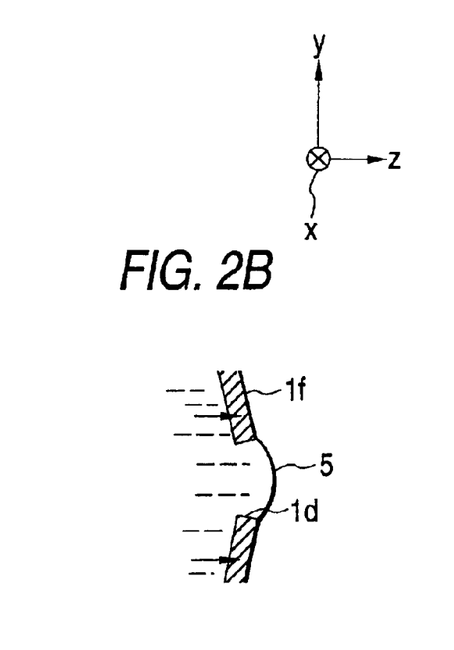
Figure 2C:
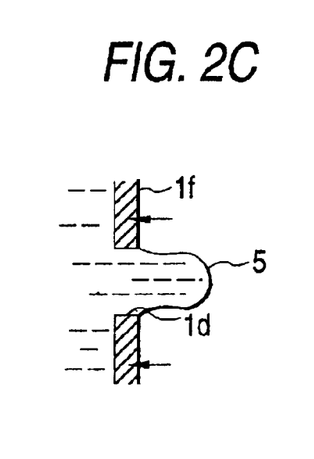
Figure 2D:
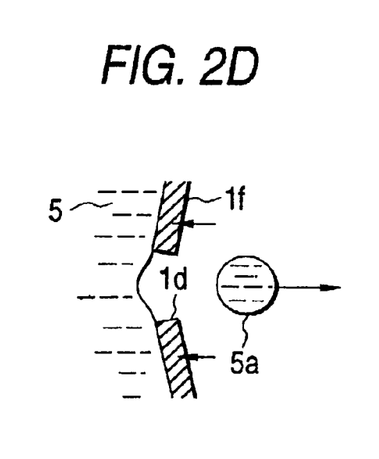

If a wall face 1f that was in a state of FIG. 2A is deformed in the plus z direction as shown in FIG. 2B, the liquid crystal 5 is also moved in the z direction, and partly protruded through the aperture 1d. When the wall face if deformed in the plus z direction is restored to its original state as shown in FIG. 2C, the liquid crystal 5 protruded is further moved in the plus z direction due to inertia. Furthermore, if the wall face 1f is deformed in the minus z direction as shown in FIG. 2D, a part of the liquid crystal 5 protruded from the aperture 1d is separated to be a granular liquid crystal 5a to proceed in the z direction.

Turning back to FIG. 1, the granular liquid crystal 5a discharged through the aperture 1d of the head portion 1a is ionized by a charged plate 6. The charged plate 6 is a cylindrical electrode to which a plus voltage is supplied from a power source 7. Reference numeral 8 denotes a switch for turning on or off a supplied voltage from the power source 7, in which a controller 15 controls the switch 8 to turn on or off. If the switch 8 is placed in on state and the granular liquid crystal 5a is discharged from the head portion 1a, the granular liquid crystal 5a is ionized to plus while passing through a cylinder of the charged plate 6. On the other hand, if the switch is placed in off state, the granular liquid crystal 5a is not ionized even if it passes through the charged plate 6.

The granular liquid crystal 5a ionized to plus is deflected in the y direction by deflecting plates 9 to collide with a substrate 12. A voltage of 3000V from the power source 10 is supplied to the deflecting plate 9. On the other hand, the granular liquid crystal 5a' not ionized travels straight on between the deflecting plates 9 in the z direction and is captured by a gutter 11. The liquid crystal captured by the gutter 11 is returned via a pipe line 13 to the liquid crystal tank 3. A portion surrounded by the two-dot chain line, including the dispenser 1, the charged plate 6, the deflecting plate 9 and the gutter 11 (hereinafter referred to as an application unit 16) can move integrally in the x direction and the y direction as seen in the figure by an xy driver 14. The oscillator 2, the pump 4 and the power source 10 are controlled by the controller 15.

Figure 3:
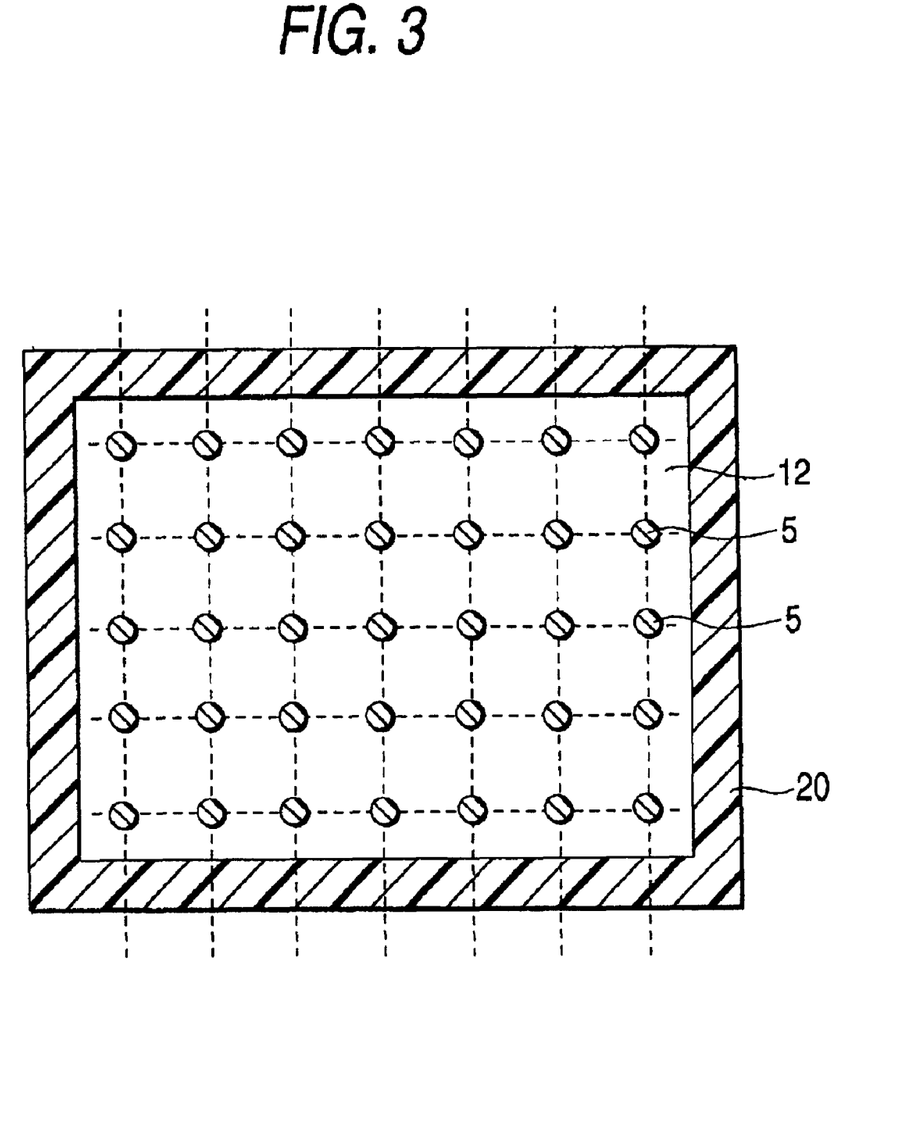
FIG. 3 is a view showing an example of the application of the liquid crystal onto a liquid crystal panel substrate 12.

FIG. 3 is a view showing an example of the application of the liquid crystal onto the liquid crystal panel substrate 12. A UV curable resin 20 is applied beforehand around the periphery of the substrate 12, and the liquid crystal 5 is dripped on a plurality of positions in a region of the substrate 12 surrounded by the UV curable resin 20. The UV curable resin 20 acts as an adhesive in laminating the substrate, and a sealing agent for sealing the liquid crystal 5 between two substrates. In the example of FIG. 3, the liquid crystal 5 is applied like an island on an intersection of lattice point. After the liquid crystal is applied in this manner, the other substrate is laminated in vacuum, and pressed to form a liquid crystal panel.

Figure 4A:
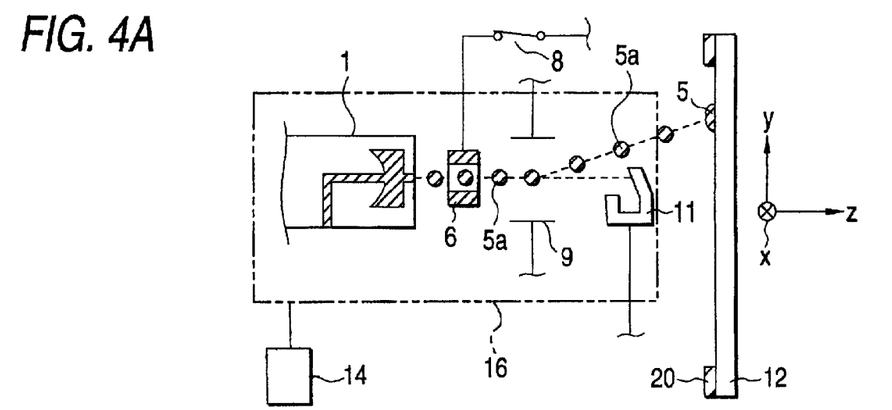
FIGS. 4A–4C are views for explaining an application procedure in applying a liquid crystal 5 on a lattice point, in which the application operation proceeds in the order of FIG. 4A to FIG. 4C.

FIGS. 4A–4C are views for explaining an application procedure in applying the liquid crystal 5 on lattice points as shown in FIG. 3, in which the application operation proceeds in the order of FIG. 4A to FIG. 4C. First of all, the xy driver 14 positions the application unit 16 so that the granular liquid crystal 5a deflected by the deflecting plate 9 collides with the lattice point on the substrate 12, as shown in FIG. 4A. Then, the switch 8 is turned on for a predetermined time period to ionize the granular liquid crystal 5a discharged from the dispenser 1. The ionized granular liquid crystal 5a is deflected by the deflecting plate 9 to be attached to the lattice points on the substrate 12 and form the island liquid crystal 5.

The granular liquid crystal 5a discharged from the dispenser 1 due to the ultrasonic vibration is very uniform in the grain diameter, in which its size (liquid crystal quantity) depends on the viscosity of the liquid crystal 5, the liquid feed amount of the pump 4, the frequency f of the vibrator 1a, and the aperture diameter of the aperture 1d. Therefore, the granular liquid crystal 5a having a desired liquid crystal quantity can be obtained by suitably setting the liquid feed amount, the frequency f and the aperture diameter. Also, the liquid crystal amount of island liquid crystal 5 is determined by how many grains of granular liquid crystal 5a are attached, whereby the on/off timing of the switch 8 is controlled in connection with the frequency f of the oscillator 2 so that a predetermined number of grains of the granular liquid crystal 5a may be ionized.

Figure 4B:
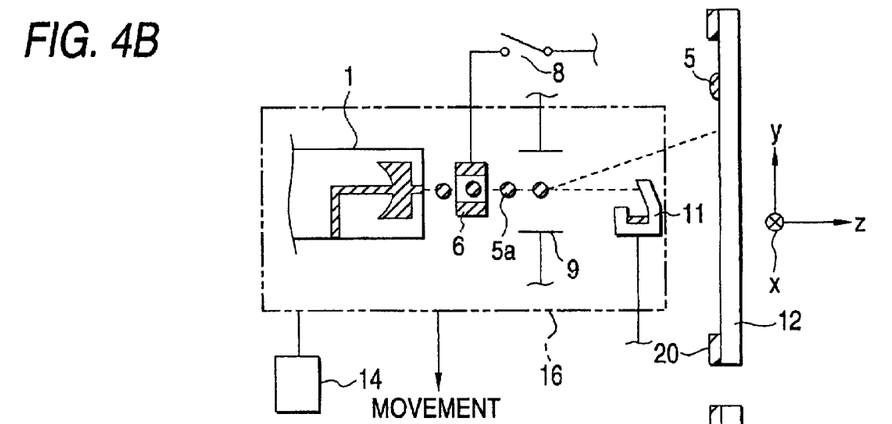
Figure 4C:
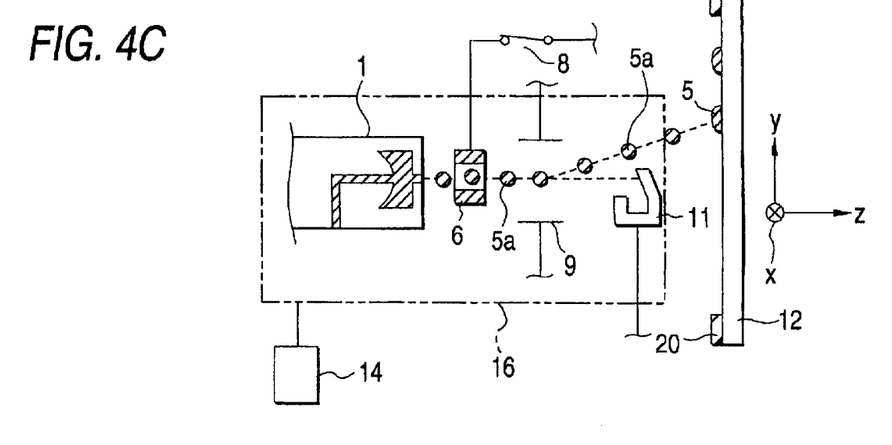

If the island liquid crystal 5 is formed by attaching a predetermined number of grains of granular liquid crystal 5a, the switch 8 is turned off, and the application unit 16 is moved a predetermined amount in the minus y direction by the xy driver 14, as shown in FIG. 4B. Since the granular liquid crystal 5 discharged from the dispenser 1 is not ionized while the switch 8 is in the off state, it travels straight on in the z direction without being deflected by the deflecting plate 9, and is captured by the gutter 11. Consequently, no granular liquid crystal Sa is attached onto the substrate 12. Then, if the application unit 16 reaches a predetermined position, the xy driver 14 is stopped to turn the switch 8 on for a predetermined time, as shown in FIG. 4C. As a result, the island liquid crystal 5 is formed on the lattice point of the substrate 12. By repeating this attaching operation, the island liquid crystal 5 is formed over the entire area surrounded by the UV curable resin 20, as shown in FIG. 3. In this embodiment, the application unit 16 is moved in the xy direction, but the substrate 12 may be moved in the xy direction.

Variation Example 1

In the above embodiment, whether or not the granular liquid crystal 5a discharged from the dispenser 1 is attached onto the substrate 12 is decided depending on whether to ionize the granular liquid crystal 5a with the charged plate 6. Namely, the charged plate 6, the switch 8, the deflecting plate 9 and the gutter 11 constitute a shutter mechanism for deciding whether or not the granular liquid crystal 5a is attached onto the substrate 12. FIG. 5 is a diagram showing a first variation example of the shutter mechanism. The shutter mechanism comprises a shutter plate 30 and a shutter plate driver 31 for moving the shutter plate 30 in the y direction. The shutter plate is controlled by the controller 15.

In this variable example 1, the granular liquid crystal 5a discharged through the aperture 1d of the dispenser 1 travels in the z direction alone in FIG. 5. If the shutter plate 30 is placed in the path of the granular liquid crystal 5a by moving it in the y direction by the shutter plate driver 31, as indicated by the two-dot chain line, the granular liquid crystal 5a is intercepted by the shutter plate 30 and not attached onto the substrate 12. The liquid crystal 5 attached onto the shutter plate 30 is moved down the surface of the shutter plate, and reserved in a liquid reservoir 30a formed on the bottom of the shutter plate 30. The liquid crystal 5 within the liquid reservoir 30a is flowed back via the pipe line 12 into the liquid crystal tank 3.

On the other hand, if the shutter plate 30 is positioned as indicated by the solid line in FIG. 5, the granular liquid crystal 5a discharged from the dispenser 1 travels in the z direction and is attached onto the substrate 12. The movement of the shutter plate 30 by the shutter plate driver 31 is made in synchronism with the frequency f of the oscillator 2, whereby the granular liquid crystal 5a traveling in the direction toward the substrate 12 can be controlled in units of grains.

Variation Example 2

Figure 6:
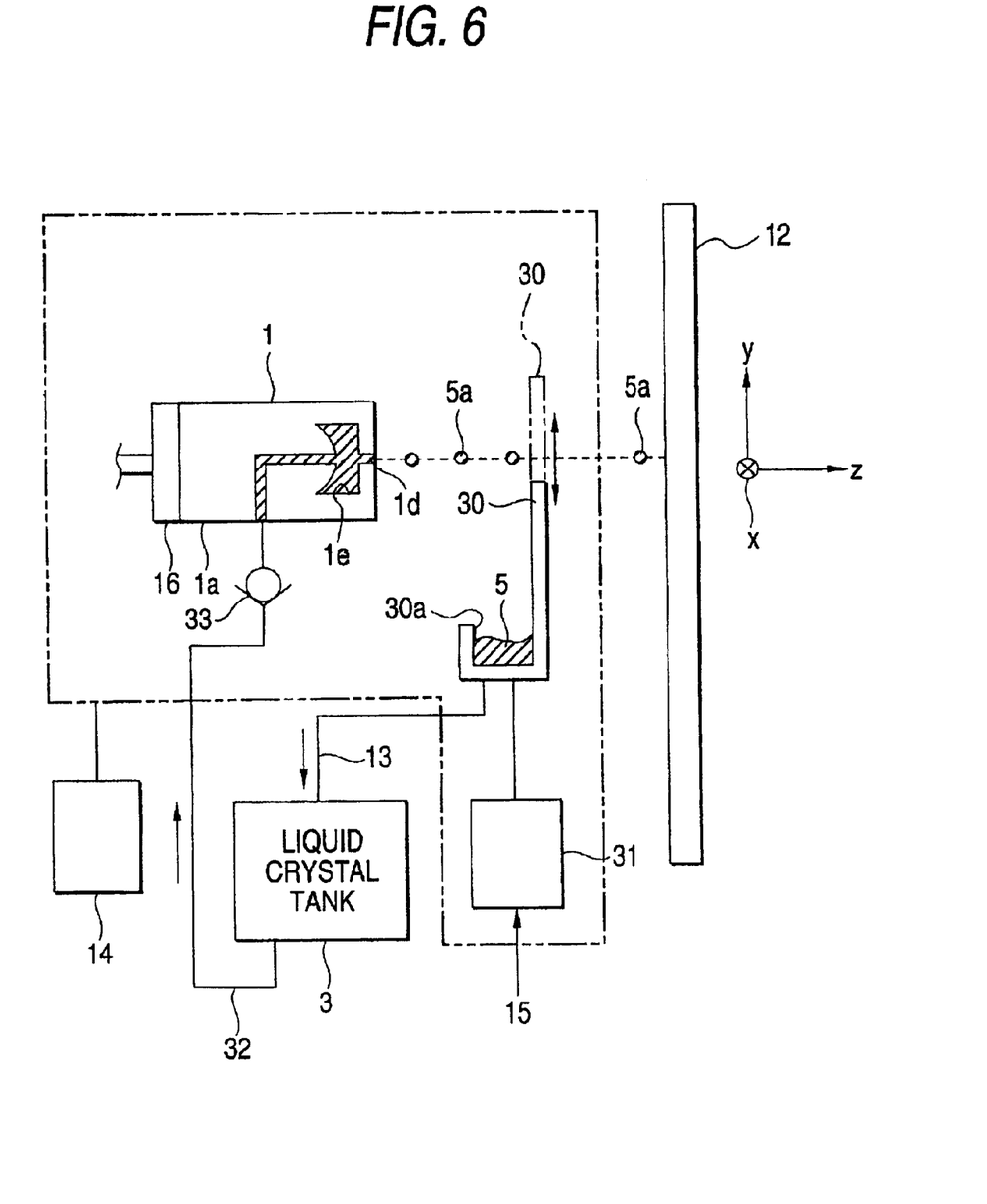
FIG. 6 is a diagram showing a second variation example of the shutter mechanism.

In the above embodiment, the liquid crystal 5 is fed to the dispenser 1 by the pump 4, but the liquid feed pump 4 may be omitted by taking the constitution as shown in FIG. 6. Namely, instead of the pump 4, a check valve 33 is provided in a pipe line 32. A process of forming the granular liquid crystal 5a is the same as in the above embodiment, and the granular liquid crystal 5a is formed in accordance with a procedure as shown in FIGS. 2A–2D. When the viscosity of the liquid crystal 5 is high, the liquid crystal can be discharged more smoothly through the aperture 1d by feeding the liquid, using the pump 4.

Liquid Crystal Drip Laminator

Figure 7:
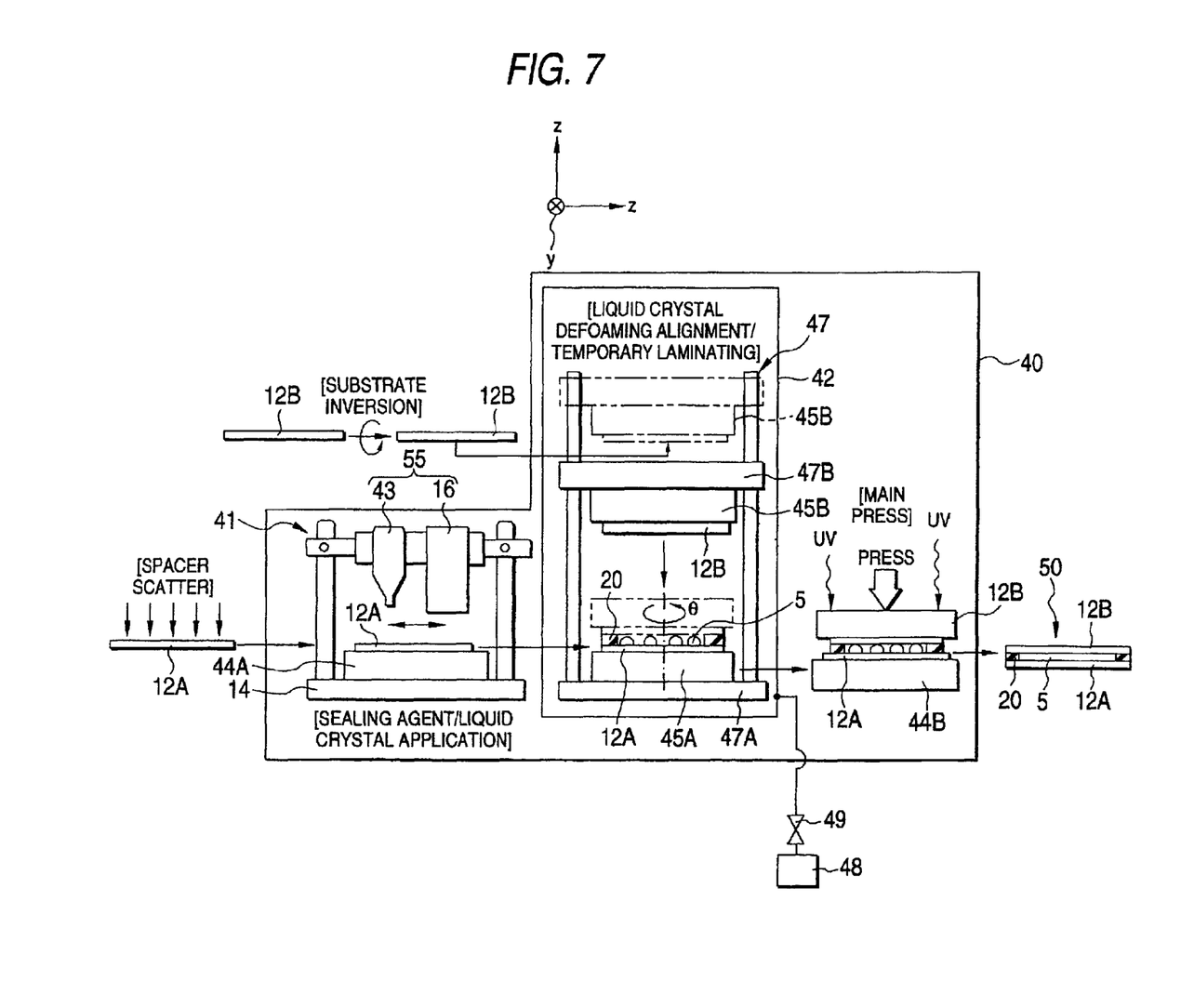
FIG. 7 is a diagram for explaining each process performed in a liquid crystal drip laminator 40.

A liquid crystal drip laminator using the liquid crystal applicator will be described below. FIG. 7 is a diagram for explaining each process performed in the liquid crystal drip laminator 40. FIG. 8 is a plan view of the liquid crystal drip laminator 40. At first, each process will be set forth with reference to FIG. 7. A spacer is scattered on a TFT substrate that is one substrate of the liquid crystal panel, and the TFT substrate 12 is attached on an adsorption chuck 44A of the liquid crystal applicator 41 provided in the liquid crystal drip laminator 40.

The xy driver 14 for the applicator 41 is fixed with the application unit 16 and a dispenser 43 for applying a seal compound of the UV curable resin 20 onto the substrate 12A. The dispenser 43 discharges the UV curable resin 20 owing to gas pressure as previously described. This applicator 41 applies the UV curable resin 20 and the liquid crystal 5 onto the substrate 12A, as shown in FIG. 3. The substrate 12A having the UV curable resin 20 and the liquid crystal 5 applied is transferred from the adsorption chuck 44A to an electrostatic chuck 45A and attached.

On the other hand, a color filter substrate 12B that is the other substrate of the liquid crystal panel is reversed by a reversal/transport robot 54 (FIG. 8) as will be described later, and attached to an electrostatic chuck 45B within a vacuum chamber 42 with the liquid crystal side face downward. The electrostatic chuck 45B is attached to an upper attachment 47B of an alignment device 47 for alignment/temporary laminating, its attaching face being opposed to the attaching face of the electrostatic chuck 45A. The upper attachment 47B is movable in the z direction (vertical direction in the figure). Also, the electrostatic chuck 45A is attached to a lower attachment 47A of the alignment device 47, in which the lower attachment 47A can position the attached electrostatic chuck 45A in the x and y directions and with the angle θ around the z axis. If the substrates 12A, 12B are conveyed into the vacuum chamber 42, a valve 49 is opened and the chamber is evacuated by a vacuum pump 48, whereby the liquid crystal is vacuum defoamed.

If the vacuum defoaming of the liquid crystal 5 is ended, the substrates 12A and 12B are aligned and laminated together. In this case, the substrates 12A and 12B are temporarily laminated by directing a UV spotlight to several points on the UV curable resin 20 applied on the substrate 12A. After the end of temporary laminating, the chamber 42 is opened to the atmosphere, and the liquid crystal panel 50 with the substrates 12A and 12B temporarily laminated is attached to the adsorption chuck 44B. Thereafter, the liquid crystal panel 50 is pressed by non-contact air press so that the gap between substrates may be a predetermined size. Then, the UV curable resin 20 that is the sealing agent is cured by directing a UV light onto the entire surface. The liquid crystal panel 20 with the substrates 12A and 12B laminated together is taken out from the laminator 40.

Referring to FIG. 8, the constitution of the laminator 40 will be schematically described. Reference numeral 51 denotes a substrate cassette for accommodating a plurality of substrates 12A, in which one substrate 12A is taken out from the substrate cassette 51 by the transport robot 52 and attached on the adsorption chuck 44A of the liquid crystal applicator 41. The substrate 12A accommodated within the substrate cassette 51 has already the spacer scattered. The liquid crystal applicator 41 is provided with a mobile stage 60 that is movable in the left and right direction (x direction) in the figure, and the adsorption chuck 44A is laid on this mobile stage 60. The applicator 41 applies the UV curable resin 20 and the liquid crystal 5, as previously described. The application unit 16 and the dispenser 43 as shown in FIG. 7 are provided in a portion as designated by reference numeral 55. The substrate 12A after application of the UV curable resin 20 and the liquid crystal 5 is attached via a gate valve 42a of the vacuum chamber 42 onto the electrostatic chuck 45A within the chamber (see FIG. 7). At this time, the mobile stage 60 is moved in the right direction in the figure to convey the substrate 12A to the vacuum chamber 42.

On the other hand, a substrate cassette 53 accommodates a plurality of substrates 12B, in which one substrate 12B is taken out from the substrate cassette 53 by a reversal/transport robot 54, reversed by 180 degrees, and then attached on the adsorption chuck 45B within the vacuum chamber 42 (see FIG. 7). The substrate 12B is carried via a gate valve 42b into the vacuum chamber 42. Thereafter, the vacuum chamber 42 is evacuated, the liquid crystal is vacuum defoamed, and the substrates 12A and 12B are temporarily laminated. After temporarily laminating, the vacuum chamber 42 is opened to the atmosphere, whereby a mobile stage 61 of a press 56 is moved via a gate valve 42c into the chamber 42. The laminated liquid crystal panel 50 is laid on the mobile stage 61 within the chamber 42.

Thereafter, the mobile stage 61 is moved in the right direction in the figure to locate the liquid crystal panel 50 at a predetermined position on the press 56. After the press process of the press 56 is ended, the liquid crystal panel 50 is conveyed by a transport robot 57 and received within a panel cassette 58.

In the above liquid crystal applicator, the dispenser 1 using the ultrasonic vibration of the piezoelectric transducer 1b forms the granular liquid crystal 5a of uniform grain diameter, and drips the granular liquid crystal 5a on the substrate 12 to make the island liquid crystal 5 consisting of a desired number of liquid crystal grains by controlling the shutter mechanism comprising the charged plate 6, the deflecting plate 9 and the garter 11. Consequently, the applicator can have the improved quantitative stability of liquid crystal. Also, if this applicator is employed for the liquid crystal drip laminator that is a liquid crystal panel manufacturing apparatus, a plurality of liquid crystal panels having a stable amount of liquid crystal can be produced.

Further, since the granular liquid crystal 5a of fine grain diameter can be formed employing the dispenser 1, the amount of liquid crystal for the island liquid crystal 5 can be minutely controlled. Thereby, it is possible to apply a precise amount of liquid crystal on the liquid crystal panel with small gap.

In the above embodiment, the liquid crystal is supplied to the head portion 1a, using the pump 4, but may be fed under pressure using a compressed gas, as performed in related art. Since the discharge of granular liquid crystal 5a from the dispenser 1 is principally governed by ultrasonic vibration, there is substantially no influence on the resolution for force feed or pressure rise delay at the time of force feed. In the applicator, the application of liquid crystal is exemplified. However, the applicator in this embodiment may apply other liquid materials, besides the liquid crystal.

In the relation of the above embodiment and the claims, the charged plate 6 corresponds to the ionizer, the deflecting plate 9 corresponds to the deflector, the gutter 11 corresponds to the capture member, the substrate 12B corresponds to the first substrate, the substrate 12A corresponds to the second substrate, and the charged plate 6, the switch 8, the deflecting plate 9 and the gutter 11, or the shutter plate 30 and the shutter plate driver 31 constitute the switching unit.

As described above, according to the first to third aspects of the invention, the liquid crystal of uniform grain diameter is discharged, employing the piezoelectric transducer, and the switch unit is controlled to drip the liquid crystal on the substrate, whereby the amount of liquid crystal applied on the substrate is managed at high precision, and the liquid crystal applicator can have the improved quantitative stability.

According to the fourth aspect of the invention, the liquid crystal is applied on the second substrate stably and precisely, whereby a number of liquid crystal panels with the same performance are produced.

What is claimed is:

1. A liquid crystal applicator for applying a liquid crystal on a substrate, comprising:
   a liquid crystal discharge unit having a piezoelectric transducer for discharging a liquid crystal due to a vibration of the piezoelectric transducer;
   a switch unit for switching whether the liquid crystal discharged from said liquid crystal discharge unit is led to said substrate, said switch unit comprising an ionizer for ionizing the liquid crystal discharged from said liquid crystal discharge unit, and a deflector for deflecting the ionized liquid crystal; and
   a controller for controlling said switch unit so that a predetermined amount of liquid crystal may be applied on said substrate.

2. The liquid crystal applicator according to claim 1, wherein said deflector is operable to deflect ionized liquid crystal to be led to said substrate.

3. The liquid crystal applicator according to claim 1, wherein said switch unit further comprises a capture member disposed in a discharge direction of said liquid crystal and capturing said liquid crystal, and wherein said controller controls said ionizer to be turned on or off so that a predetermined amount of liquid crystal may be applied on said substrate.

4. The liquid crystal applicator according to claim 1, further comprising:
   a liquid crystal reservoir for storing the liquid crystal; and
   a pump for supplying the liquid crystal from said liquid crystal reservoir to said liquid crystal discharge unit.

5. An apparatus for manufacturing a liquid crystal plate for laminating a first substrate and a second substrate having a liquid crystal applied on one face so that the liquid crystal is provided between said first substrate and said second substrate to form the liquid crystal panel, the apparatus comprising:
   a liquid crystal applicator for applying the liquid crystal on the one face of said second substrate, said liquid crystal applicator including:
      a liquid crystal discharge unit having a piezoelectric transducer for discharging the liquid crystal due to a vibration of the piezoelectric transducer;
      a switch unit for switching whether the liquid crystal discharged from said liquid crystal discharge unit is led to said second substrate, said switch unit comprising an ionizer for ionizing the liquid crystal discharged from said liquid crystal discharge unit, and a deflector for deflecting the ionized liquid crystal;
      and a controller for controlling said switch unit so that a predetermined amount of liquid crystal may be applied on said second substrate.

6. The apparatus according to claim 5, wherein said deflector is operable to deflect ionized liquid crystal to be led to said second substrate.

7. The apparatus according to claim 5, wherein said switch unit further comprises a capture member disposed in a discharge direction of said liquid crystal and capturing said liquid crystal, and a wherein said controller controls said ionizer to be turned on or off so that a predetermined amount of liquid crystal may be applied on said second substrate.

8. A method of applying a liquid crystal on a substrate, said method comprising:

discharging the liquid crystal due to a vibration of a piezoelectric transducer; and switching whether the discharged liquid crystal is led to the substrate so that a predetermined amount of liquid crystal may be applied on the substrate, said switching step including the steps of ionizing the discharged liquid crystal, and deflecting the ionized liquid crystal.

9. The method according to claim 8, wherein said switching step comprises capturing the discharged liquid crystal not to be led to said substrate.

10. The method according to claim 8, wherein said deflecting step includes deflecting the ionized liquid crystal to be led to said substrate.

* * * * *